3,094,376
METHOD OF CONSTRUCTION OF LOW FRICTION ELEMENTS
Paul P. Thomas, Detroit, Mich., assignor to American Metal Products Company, Detroit, Mich., a corporation of Michigan
Filed Oct. 3, 1958, Ser. No. 765,213
6 Claims. (Cl. 18—59)

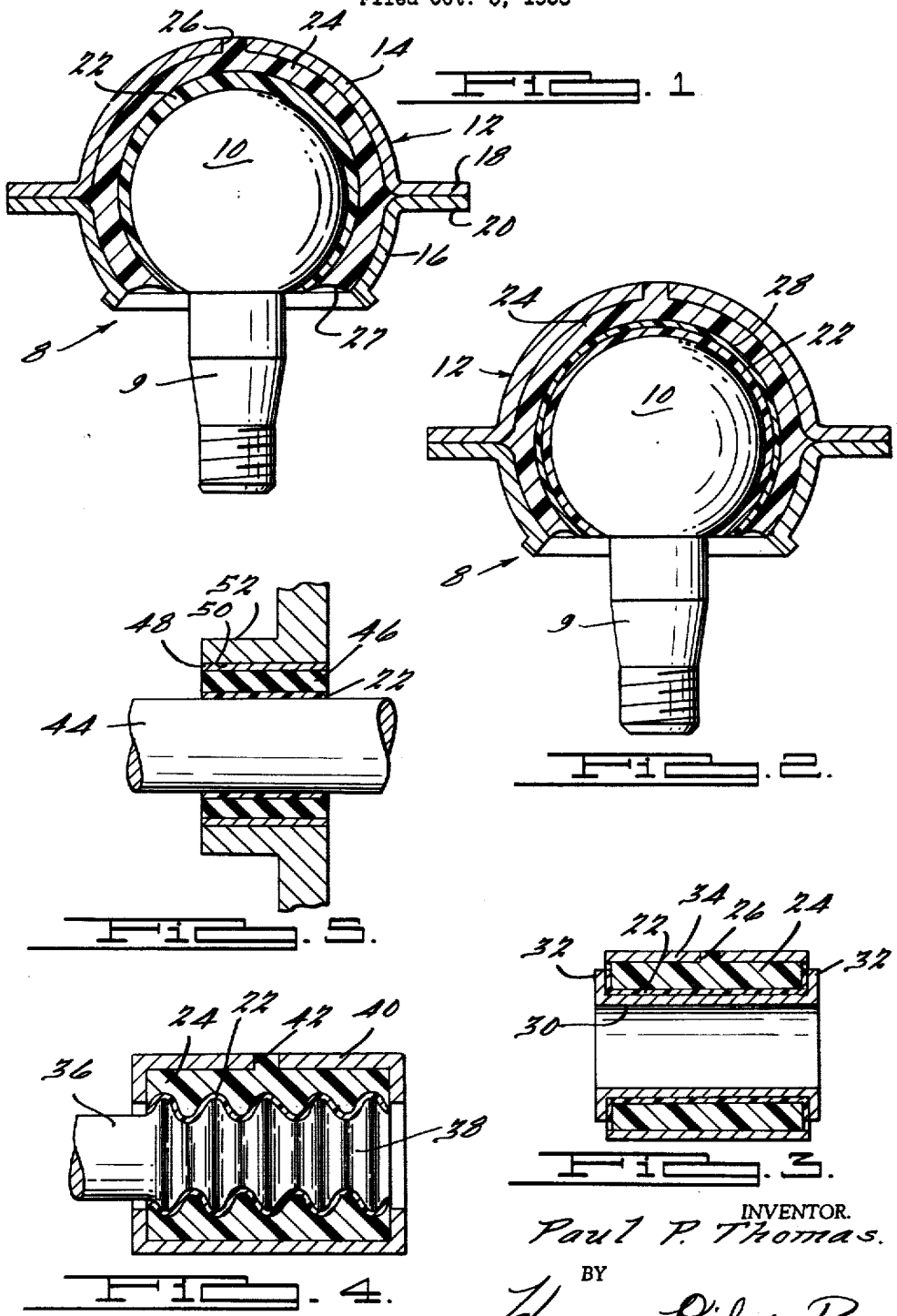

This invention relates to a method for constructing low friction elements and particularly to an element of predetermined surface configuration having a low friction material conformed directly thereto and engaged by a backing material in a manner to prevent movement therebetween.

In its broadest form, the present invention relates to the basic concept of applying a relatively thin coating of a suitable low friction material directly to an element having a surface of predetermined configuration so that the low friction material accurately conforms to the surface and is mechanically locked thereon after it hardens.

It is apparent that once such a low friction coating is provided about an element, a number of suitable backing materials can be engaged therewith to complete a bearing structure. For example, a polytetrafluoroethylene dispersion in water may be coated on the ball of a stud and ball by brushing, spraying or dipping, and the water evaporated off by the application of heat to leave a solid coating of polytetrafluoroethylene mechanically locked to the ball. If desired, the polytetrafluoroethylene can also be sintered by heating to approximately 700° F. to provide a tougher coating.

A preformed rubber boot can then be slipped over the low friction material and a housing clamped thereabout to compress the rubber against the low friction material with a predetermined pressure. Since the friction between the compressed rubber and the low friction material is greater than that between the low friction material and the finished surface of the ball, the low friction material is retained against movement relative to the rubber boot but can move relative to the surface of the element.

In this manner, an excellent ball joint is formed which is dampened against vibrations and absorbs shocks, and wherein the low friction material is molded or mated directly to the surface of the ball to eliminate the problem of maintaining diameters between the ball and the backing element. As is well known, very accurate spherical or cylindrical surfaces can be precision machined, but it is extremely difficult to maintain the diameters of two separate spherical surfaces within tolerances which will permit them to be accurately engaged with one another in a bearing relationship.

Of course, as previously stated, the backing material can be any suitable material so long as it can engage the low friction material in a manner to prevent movement therebetween and maintain the low friction material in intimate engagement with the surface of the element. For example, a hardenable material such as a thermosetting or thermoplastic material can be molded about the low friction material under pressure so that the hardenable material impinges thereon and is mechanically retained against movement relative thereto after it hardens. It is apparent that after hardening, the hardenable backing material also provides a rigid backing suitable for many bearing applications.

Experience has proved that the engagement between the low friction material and the backing material employed need only be great enough to withstand any initial break-away force that may be necessary to free the coating of low friction material from the surface of the element. Once this is accomplished, the backing material will retain the low friction material against movement relative thereto since there is relatively little friction between the low friction material and the finished surface of the ball as compared to that between the low friction material and the backing material.

The main objects of the invention are: to provide a method of coating a relatively thin film of low friction material such as polytetrafluoroethylene to a surface of predetermined configuration, and molding a backing material about the low friction material in a manner to prevent movement therebetween and to maintain the low friction material in intimate engagement with said surface; to provide a method of coating a relatively thin film of low friction material to an element having a surface of predetermined configuration, positioning a housing about said element and injecting a hardenable backing material within said housing so as to entirely fill the space therein and retain the low friction material against movement relative to the housing after hardening.

Other objects and features of novelty of the invention will be specifically pointed out or otherwise become apparent when referring, for a better understanding of the invention, to the following description taken in conjunction with the accompanying drawing, wherein:

FIGURE 1 is a sectional view of a ball joint bearing element embodying features of the invention;

FIG. 2 is a sectional view of a ball joint bearing element illustrating another embodiment of the invention;

FIG. 3 is a sectional view of a bushing-type bearing element illustrating still another modification of the invention;

FIG. 4 is a sectional view of a bearing element illustrating still another modification of the invention; and FIG. 5 is a sectional view of an elastomeric seal embodying features of the invention.

Referring to FIG. 1, a ball joint 8 embodying features of the invention is comprised of a stud 9 having a ball 10 on the end thereof with a split housing 12 positioned about the ball, the housing having an upper half 14 and a lower half 16 with annular flanges 18 and 20 thereon which are suitably secured together as by spot welding, or the like.

A relatively thin coating of low friction material 22 is coated about the surface of the ball 10 and a hardenable backing material 24 is injected under heat and pressure through an aperture 26 in the upper half 14 of the housing 12 so as to entirely fill the space within the housing, a suitable male die element or plug (not shown) being disposed over the stud 9 in a manner to close off the annular opening 27 defined by the stud and the lower half 16 of the housing to prevent the escape of the hardenable backing material 24 when it is injected.

Since the hardenable backing material 24 is injected under heat and pressure, it will impinge upon, or press into, the coating of low friction material so that there is a substantial frictional engagement or mechanical locking therebetween. When the hardenable backing material 24 hardens, either by the application of additional heat if it is a thermosetting material, or by cooling if it is a thermoplastic material, it will serve as a rigid backing for maintaining the coating of low friction material 22 in intimate engagement with the surface of the ball 10. As previously stated, the frictional engagement between the hardenable material 24 and the low friction material 22 will be great enough to prevent movement therebetween and the hardenable backing material, in turn, can either be bonded to the inner surface of the housing 12 by conventional bonding materials, or mechanically retained against movement relative thereto by providing the housing with an irregular inner surface.

When the bearing element 8 is completed, a sharp break-away force can be applied between the housing 12 and the stud 9 to free the low friction material 22 from the spherical surface of the ball 10. Experience has proved that such a break-away force may be necessary when the bearing is constructed as previously described because even highly polished metal surfaces have small irregularities, and the low friction material 22 will tend to mate with these irregularities and consequently tend to stick to the ball. However, once the low friction material is broken away, it forms a very accurately mated low friction bearing surface.

The low friction material 22 can be any suitable low friction material that can be applied to the surface of the ball 10 to form a solid, thin film or coating mated directly to the ball. By way of example only, some suitable low friction materials are polytetrafluoroethylene, Kel-F, nylon, Super Dylan, made by the Koppers Company, Pittsburgh 19, Pennsylvania, Marlex, made by the Phillips Petroleum Company, and Fortiflex, made by the Celanese Corporation of America.

The low friction material can be in any initial form whatsoever such as in a dispersion or solution form capable of being applied to the surface of the ball 10 by brushing, spraying or dipping, a plastic or powder state wherein it can be molded about the surface of the ball, or in a sheet form that can also be molded to the surface of the ball 10. When a solid sheet of low friction material, such as polytetrafluoroethylene, is used, the ball 10 can be heated and pressed into the sheet so that the sheet is stretched or molded about the surface of the ball to provide the low friction coating. Of course, this is only one example of a suitable method for molding sheets about the ball or other elements, and other methods may be equally suitable such as, for example, using appropriate dies to form the sheet about the ball.

By way of example only, the following specific low friction materials can be employed in practicing the present invention. An aqueous dispersion supplied by Du Pont de Nemours, Inc., containing (a) 59 to 61% by weight of tetrafluoroethylene resin, (b) 5.5 to 6.5% (by weight of tetrafluoroethylene resin) of Triton, a non-ionic wetting agent, and (c) the remainder being water, and the water can be driven off by gentle heating after which temperatures of approximately 680° F. to 750° F. may be employed to sinter the minute particles of polytetrafluoroethylene to form a solid coating of high strength.

Nylon may also be used in the form of a water-isopropyl alcohol dispersion, the formulation by weight being as follows: (a) 20% nylon, (b) 80% water, and (c) 20% isopropyl alcohol. This dispersion is applied in exactly the same manner as the polytetrafluoroethylene dispersion, the solvents being driven off by gentle heating and then the nylon is sintered at a temperature of approximately 325° F.–400° F.

The low friction material may also be applied in the form of a solution, such as a polyethylene solution, for example. As is well known, there are approximately 100 different brands of polyethylene, but applicant has found Dylan 6600 produced by the Koppers Company of Pittsburgh, Pennsylvania, to be the most suitable for bearing applications. The solution of the Dylan 6600 is obtained by heating a mixture of 15 parts Dylan 6600 and 35 parts by weight of tetrahydronaphthalene or decahydronaphthalene at approximately 350° F. for about five minutes. This solution is applied to the ball 10, for example, and on cooling it gels, after which the solvent is driven off by gentle heating at approximately 270° F. The 270° F. temperature should be carefully controlled since too high a temperature will cause the low friction material to run and too low a temperature will result in an incomplete fusion.

Various monochlorotrifluoroethylene (sometimes referred to as polyhalocarbon) solutions and/or dispersions may also be employed but it might be mentioned that this material is not dispersed in water but rather in an organic solvent and the solution is made up of a monochlorotrifluoroethylene resin dissolved in the monochlorotrifluoroethylene monomer. Such solutions and dispersions can be obtained from the Bakelite Co., Division of Union Carbide and Carbon Corp., 30 E. 42nd Street, New York 17, N.Y., and the M. W. Kellogg Co., Jersey City, N.J.

It has been found that when the low friction material is applied in dispersion form, such as when a polytetrafluoroethylene dispersion is used, it need not be sintered prior to engaging it with the backing material. The polytetrafluoroethylene dispersion can be gently heated at temperatures slightly above the boiling point of water to evaporate the water which leaves a flaky coating of polytetrafluoroethylene which in turn can be further heated, if desired, at temperatures of approximately 450° to provide a tougher coating. When the polytetrafluoroethylene is heated at temperatures of 225°, for example, to evaporate the water, the minute particles of polytetrafluoroethylene remaining tend to stick together to form the aforesaid flaky coating. The reason for this is not clearly understood, but it is believed that it may be due to an electronic bond between the particles or that the Triton tends to hold the particles together. In any event, the flaky coating can be engaged by a backing material as previously described to form a bearing element.

If the backing material is injected, additional care must be taken to assure that the flaky coating is not washed away during the injection, and the hardenable backing material is preferably heated to higher temperatures to make it flow better. Further, when the flaky coating is heated to approximately 450° as previously mentioned, it has been observed that it is tougher and more solid and can be handled more readily. It is believed that this is due to a change of state of the Triton from a gel to a solid state that acts to hold the polytetrafluoroethylene particles firmly together. Of course, when the polytetrafluoroethylene is sintered at higher temperatures, the Triton is driven off as a gas and the polytetrafluoroethylene particles fuse together to form an even stronger coating.

The hardenable material 24 can also be any suitable thermosetting or thermoplastic material as long as it can be molded about the ball in the manner described, and hardened to provide the required rigidity. Reference is made to the copending application of Paul P. Thomas, Serial No. 680,293, filed on August 26, 1957, and assigned to the assignee of the present invention for examples of the composition of the hardenable material 24, as well as, for a complete and full description of the method of injecting the hardenable material in the above-described manner.

By way of example only, and as disclosed in the aforesaid copending application, phenolic impregnated glass fibrous material procurable in the trade under the name of Durez, and a form of nylon material, procurable on the market under the name of Zytel, may be employed as the hardenable material 24, as well as, a phenolic and polyethylene impregnated glass fibrous material. As will be more clearly pointed out in detail hereinafter, the hardenable material 24 may also be a rubber or other resilient material which can be injected about the low friction material 22 and hardened or, if desired, a preformed rubber boot can be used as the backing element, as previously explained.

From the foregoing, it is readily apparent that a variety of backing materials may be used since, as stated previously, the only requirement is that the backing material or element engage the low friction material 22 in a manner to prevent movement therebetween and maintain the low friction material in intimate contact with the surface of the ball 10 or other element that may be employed. Therefore, it is to be specifically understood that the present invention is not limited to the particular backing material employed since any backing material that can fulfill the aforementioned requirement obviously falls within the purview of the invention.

It is also to be specifically understood that the present invention is not limited to the injection of the hardenable material 24 within the housing 12 since it is readily apparent that the hardenable material can also be compression molded thereabout, for example, to obtain substantially the same result. In this regard, the hardenable material 24 can be positioned about the low friction material 22 in a plastic state so that when the split housing 12 is clamped thereabout, it will compress the hardenable material so that it impinges upon the surface of the low friction material to provide the required frictional engagement when it hardens. The aforementioned male die or plug member (not shown) may be used as previously described to close off the annular opening 27 at the bottom of the lower half 16 of the housing 12, and if desired the die element can also be utilized to exert additional pressure on the hardenable material 24 before it hardens.

Still further, if the hardenable material 24 is a thermosetting material it can be preformed and partially cured as an insert which can be positioned between the housing and the low friction material 22. Partial curing of thermosetting material is commonly referred to as the postsettable or "B" stage, and heat and pressure can thereafter be applied to finally cure and conform the insert to the low friction material. Of course, the insert would have to be split in two to permit it to be positioned about the ball 10, or else be formed in two separate pieces which can be fitted together about the ball.

When the hardenable material 24 is injected through the aperture 26 of the housing 12 under heat and pressure, as previously described, it has been found that it will sometimes tend to impinge directly upon the coating of low friction material 22 at the dome of the ball 10 with a force sufficient to break the coating at this point. Then, as the hardenable material moves about the ball to fill the housing 12, it may tend to wash the coating from the surface of the ball. There are several ways to overcome this problem, one being to control the initial pressure under which the hardenable material 24 is injected so that it will not strike the coating with sufficient force to break it.

Another way of overcoming this without controlling the initial injection pressure is illustrated in FIG. 1 wherein the coating of low friction material 22 is thickened slightly at the dome of the ball 10 and gradually reduced in thickness at the lower portion of the ball. This provides a thicker coating at the critical point adjacent the aperture 26 which will withstand the initial impact of the hardenable material 24. As an alternative to this, the entire coating of low friction material 22 can be thickened, if desired, so that it will be more able to withstand the penetration of the hardenable material 24 through to the surface of the ball 10.

At this point, it may be well to point out that the coatings of low friction material illustrated in FIG. 1, as well as, the other figures of the drawing, have been enlarged for the purposes of illustration, and the coating of FIG. 1 has been enlarged to an even greater extent to more clearly illustrate the aforementioned variation in thickness thereof. In practice, applicant has successfully employed coatings varying in thickness from .001 to .015 inch at the lower portion of the ball 10 and from .010 to .030 inch at the dome of the ball adjacent the aperture 26.

Compression molding techniques may be employed to make the coating of low friction material on the ball 10 vary in thickness from the throat to the dome as previously described. Compression molding also enables the low friction coating to be made more dense to provide a much stronger or tougher coating which can more readily prevent penetration of the hardenable backing material 24. Of course, as just stated previously, the thickness of the low friction coating itself can be varied to alter its barrier characteristics.

As illustrated in FIG. 2, a relatively thin coating of varnish 28, or the like, can be applied to the coating of low friction material 22 to act as a barrier to help prevent the penetration of the hardenable material 24 through to the surface of the ball 10. Since the coating of varnish is relatively thin, it is flexible enough so that it will not interfere with the aforementioned mechanical locking or frictional engagement between the low friction material 22 and the hardenable material 24.

Of course, the present invention is not limited to ball joint applications and, in this regard, a bushing-type bearing element embodying features of the invention, is illustrated in FIG. 3 wherein the coating of low friction material 22 is applied to the cylindrical surface of a sleeve 30 and also to the inner surfaces of the radially projecting locking flanges 32 on the ends thereof. The hardenable material 24 can be molded about the coating of low friction material and within a cylindrical housing 34 in any of the manners or methods previously described but, as illustrated in FIG. 3, the aperture 26 is provided so that the hardenable material can be injected within the housing 34 in this particular example.

With this construction, an assembly is provided wherein the sleeve 30 can rotate relative to the housing 34 but is prevented from moving axially relative thereto by the locking flanges 32. Such an assembly is useful for many bearing applications such as, for example, pivotally supporting a control arm relative to the housing 34 by fixing a portion of the arm within the sleeve 30 or, for rotatably supporting a shaft relative to the housing 34 by fixing the shaft within the sleeve 30. It is also apparent that the locking flanges 32 could be eliminated so that the sleeve 30 could be withdrawn to leave a bushing-type bearing element which is usable on any shaft having the same size as the sleeve 30. This provides a relatively inexpensive bushing-type bearing construction useful for many applications.

The present invention is also applicable to surfaces having a variety of predetermined configurations and, to further illustrate this point, reference is made to FIG. 4 wherein the coating of low friction material 2 is applied to the end of a shaft 36 having a plurality of annular grooves 38 thereon. A housing 40 having an aperture 42 therein is disposed about the grooved portion of the shaft 36, and the hardenable material 24 is injected or otherwise molded thereabout as previously described to form a bearing element for supporting the end of a shaft 36 in a manner to permit rotation thereof relative to the housing 40, but to prevent longitudinal movement thereof, the housing 40 being fixed against movement by any suitable means such as by mounting it on the frame of a machine. Also, if desired, the end of the shaft 36 could be formed with a spiral thread rather than the grooves 38 so that the shaft could both rotate and move axially relative to the housing 40 similar to the manner in which a lead screw functions.

With regard to the employment of rubber or other resilient material as a backing for the low friction material 22, when the rubber is compressed about the low friction material, a frictional engagement is created therebetween which is generally sufficient to withstand any break-away force that may be required. Thereafter, the rubber will easily maintain the low friction material against movement relative thereto, as well as, relative to a housing which may be clamped about the rubber backing material to provide the desired compression.

When a rubber or resilient backing material is employed, it is apparent that the present invention readily lends itself for use in a variety of seal applications, one example of which is illustrated in FIG. 5 wherein the coating of low friction material 22 is applied to the surface of a shaft 44, and a preformed rubber bushing 46 is compressed thereabout by a suitable ring 48. In this manner, the low friction material 22 is retained against movement relative to the rubber bushing and metal ring through friction, as previously described. The entire assembly may then be disposed within a suitable aperture 50 in a housing 52 so that the shaft 44 is mounted for either rotation or reciprocation relative to the housing 52. The structure of FIG. 5 is well suited for use as a seal for the operating ends of hydraulic air cylinders, and the like, wherein the shaft 44 could be the reciprocating shaft of a hydraulic or air cylinder, and the housing 52 could be the front cover plate of the cylinder body.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. The method of constructing a low friction element, which includes the steps of, applying one or more coatings of like low friction material in solution form directly to an element of curved surface configuration, driving the liquid from the solution, positioning a housing about said element and molding a hardenable backing material within said housing so as to completely fill the space therein, said molded material engaging said coating material and housing in a manner to prevent rotation therebetween when producing relative movement between said element and the low friction coating.

2. The method of constructing a low friction element, which includes the steps of, applying a coating of a solution containing a low friction material directly to an element of curved surface configuration, positioning a housing about said element, driving the liquid from the solution, and injecting a hardenable backing material within said housing so as to completely fill the space therein, said injected material engaging said coating material and housing in a manner to prevent rotation therebetween.

3. The method, of constructing a low friction element, which includes the steps of, applying one or more coatings of like low friction material in a solution directly to an element of curved surface configuration, having the liquid from the solution, positioning a housing about said element, and positioning a hardenable rubber backing material within said housing so as to completely fill the space therein and exert a predetermined pressure on said coating, the engagement between the rubber backing material and the coating being at least great enough to withstand any initial break-away force to free the coating from the surface of the element.

4. The method of constructing a low friction element, which includes the steps of, applying a coating of a solution containing a low friction material directly to an element of curved surface configuration, positioning a housing about said element, driving a liquid from the solution, and injecting a hardenable rubber backing material within said housing so as to completely fill the space therein and exert a predetermined pressure on said dried coating after the rubber hardens, the pressure engagement between the rubber backing material and the coating being at least great enough to withstand any initial break-away force to free the coating from the surface of the element.

5. The method of constructing a low friction element, which includes the steps of, applying one or more coating of like low friction material in a solution directly to an element of curved surface configuration, driving the liquid from the solution, engaging said coating with a resilient preformed backing element, and clamping a housing about said backing element to compress the backing element into sufficient frictional engagement with said coating to withstand any break-away force necessary to free the coating from the surface of the element.

6. The method of constructing a low friction element, which includes the steps of, applying one or more coatings of like low friction material in liquid dispersion form directly to an element of curved surface configuration, sintering said coating by the application of heat which drives the liquid therefrom, and molding a hardenable backing material about said coating in a manner to prevent movement therebetween and maintain the coating in intimate engagement with said surface.

References Cited in the file of this patent

UNITED STATES PATENTS

| | | |
|---|---|---|
| 1,881,601 | Hufferd et al. | Oct. 11, 1932 |
| 2,407,559 | Krotz | Sept. 10, 1946 |
| 2,666,677 | Miller | Jan. 19, 1954 |
| 2,718,452 | Lonz | Sept. 20, 1955 |
| 2,778,664 | Herbenar | Jan. 22, 1957 |
| 2,851,314 | Thomson | Sept. 9, 1958 |
| 2,865,692 | Gossmann | Dec. 23, 1958 |
| 2,877,504 | Fox | Mar. 17, 1959 |
| 2,885,248 | White | May 5, 1959 |
| 2,919,150 | Baker | Dec. 29, 1959 |
| 2,961,704 | White | Nov. 29, 1960 |

UNITED STATES PATENT OFFICE
CERTIFICATE OF CORRECTION

Patent No. 3,094,376            June 18, 1963

Paul P. Thomas

It is hereby certified that error appears in the above numbered patent requiring correction and that the said Letters Patent should read as corrected below.

Column 7, lines 28 to 30, for "positioning a housing about said element, driving the liquid from the solution," read -- driving the liquid from the solution, positioning a housing about said element, --; line 37, for "having" read -- driving --; column 8, lines 3 and 4, for "positioning a housing about said element, driving a liquid from the solution," read -- driving a liquid from the solution, positioning a housing about said element, --.

Signed and sealed this 3rd day of March 1964.

(SEAL)
Attest:

ERNEST W. SWIDER
Attesting Officer

EDWIN L. REYNOLDS

Acting Commissioner of Patents